2,352,179

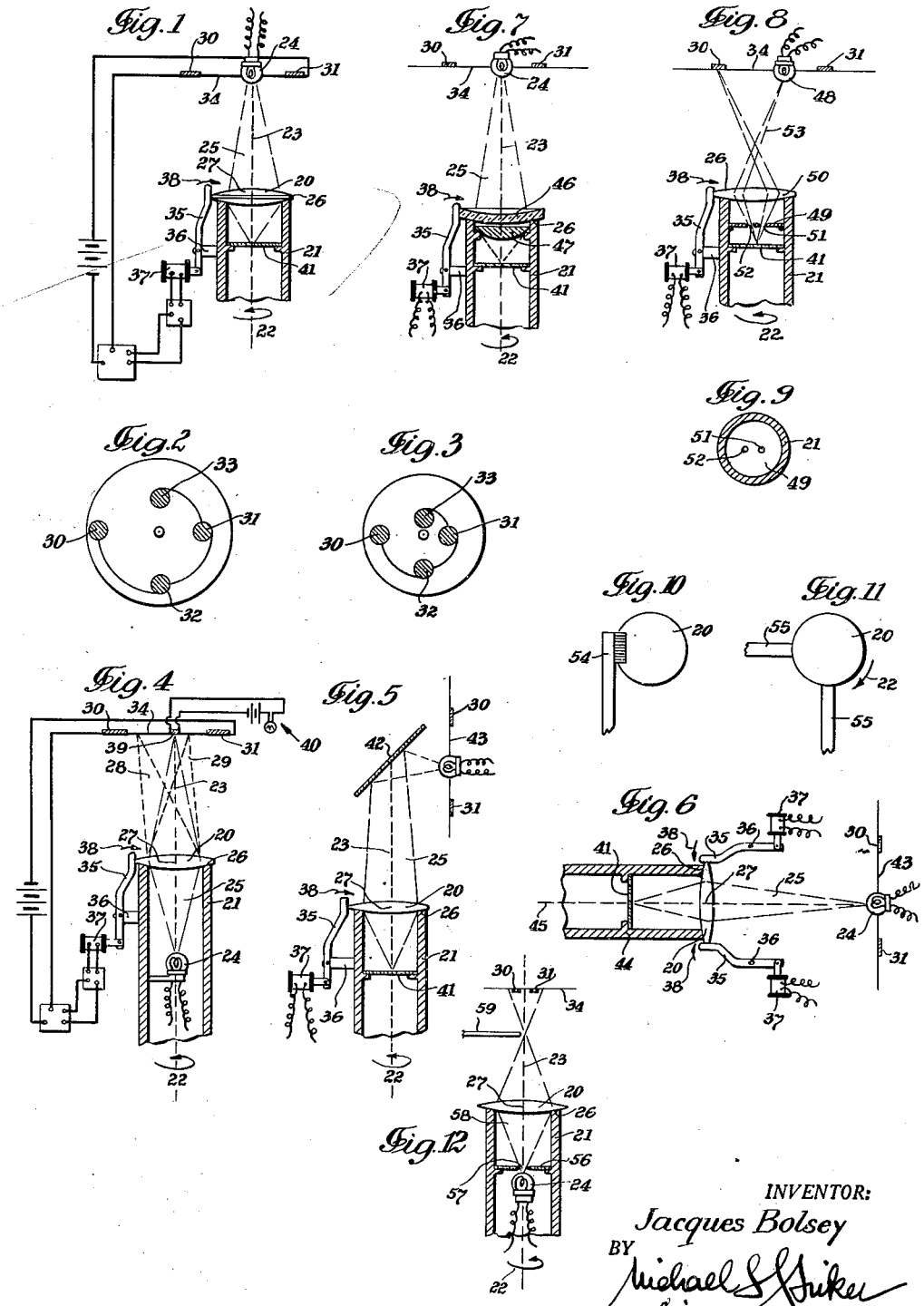
June 27, 1944.     J. BOLSEY     2,352,179
LENS CENTERING DEVICE
Filed Jan. 5, 1943
INVENTOR:
Jacques Bolsey Patented June 27, 1944

UNITED STATES PATENT OFFICE 2,352,179

LENS CENTERING DEVICE

Jacques Bolsey, New York, N. Y.

Application January 5, 1943, Serial No. 471,325

16 Claims. (Cl. 88—1)

My present invention relates to devices for adjusting the position of lenses on corresponding supports and more particularly to a device for centering a lens on a rotating support in alignment with the axis of rotation of this support.

It is an object of my present invention to provide means enabling substantially automatic adjustment of a lens blank on a support.

A further object of my present invention consists in a device for centering a lens or lens blank on a rotating support without the necessity of any manual centering operation.

Still a further object of my present invention consists in a device indicating when a lens is in incorrect unadjusted position and centering the lens as required.

Still another object of my present invention consists in means automatically indicating when the lens is correctly centered on its stationary or rotating support.

With the above objects in view, my present invention mainly consists in a new device comprising a light source for projecting a light beam through the lens or lens blank while the same is lying on a support; this light beam is passing through the lens and then moving along a predetermined path when the lens is lying on the support in adjusted correct position and is deflected by this lens from this predetermined path when the lens is lying on the support in unadjusted incorrect position; the new device according to my present invention furthermore includes, as its most important characteristic feature, light-sensitive photo-electric means arranged near this predetermined path of the light beam in such a manner that this light beam impinges on these light-sensitive photo-electric means when the lens is lying on its support in unadjusted incorrect position and the light beam passing through it is thereby deflected from its predetermined path.

The light-sensitive photo-electric means described above may serve either for operating indicating means showing whether the lens is in adjusted or unadjusted position on its support or, in accordance with a preferred embodiment of my invention, they may serve to influence separate adjusting means in such a manner as to move the lens toward its adjusted correct position whenever the light beam is deflected from its predetermined path and impinges on these light-sensitive photo-electric means.

It is evident that by such an arrangement manual centering and adjusting of the lens or lens blank on its stationary or rotating support can be substantially entirely avoided and thereby such centering made independent from human skill and experience; simultaneously, my new device substantially reduces the time needed for such centering operation. Furthermore, my new arrangement may also serve for permanent control of proper centering of the lens during treatment, i. e. edging, grinding or polishing of the same, by immediately indicating any deviation of the lens or lens blank from its correctly centered adjusted position on its support.

It should be stressed that the term "lens" as used in the following description and claims is intended to include not only finished lenses but also lens blanks and other optical elements adapted to deflect a light beam passing through them. It should also be mentioned that the term "support" as used in the following description and claims is to be understood in its broadest meaning and is intended to cover all types of supporting elements and members used for supporting lenses during treatment, i. e. edging, grinding, and polishing, and during testing, assembling, or other operations.

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1 shows a centering device according to my present invention;

Figures 2 and 3 show various photo-electric arrangements used in the device shown in Figure 1;

Figures 4, 5, and 6 show various modifications of the device shown in Figure 1 in longitudinal section;

Figure 7 is a longitudinal section of a device according to the present invention adapted for centering concave negative lenses;

Figure 8 is a longitudinal section of a device according to the present invention adapted for centering substantially symmetrical lenses;

Figure 9 is a cross section of the device shown in Figure 8 along line 9—9;

Figures 10 and 11 show various lens adjusting means used for the new lens centering devices shown in the above figures; and Figure 12 is a longitudinal section of a modified device according to my present invention.

In all figures, the numeral 20 designates a lens or lens blank lying on support 21 which is rotating in direction of arrow 22 about its axis of rotation indicated in the figures by dotted line 23. The object of my new device is to center lens 20 on the rotating support 21 in alignment with the axis of rotation 23 of this support.

As already stated above, this my new device comprises a light source 24 for projecting a light beam 25 through lens 20 while it is supported, preferably along its edge portions 26, by the hollow support 21 and is rotating with the same. As shown in Figure 4, this light beam 25 is passing through lens 20 and moving along a predetermined path when the center 27 of lens 20 is lying in the axis of rotation 23 of support 21 and is deflected from this predetermined path when the lens center 27 is outside of axis 23. Such possible deflected positions of light beam 25 are shown in Figure 4 in dotted lines and indicated by numerals 28 and 29.

As shown in this same Figure 4, a series of light-sensitive means, e. g. photo-electric cells, 30, 31, 32, 33 are arranged on the stationary support 34 in the path of light beam 25 around the predetermined path of this light beam which path is shown in this figure in full lines. These photo-electric cells 30 to 33 are arranged at different distances from the predetermined path of light beam 25 in one of the ways shown in Figures 2 and 3. The cell arrangements shown in these figures are very similar to each other, the only difference being that in Figure 2 the cells are at a greater distance from the predetermined path of light beam 25 than in Figure 3. Thus, the arrangement shown in Figure 2 is adapted for rough centering of the lens while the arrangement of Figure 3 serves for accurate adjustment of the lens position.

These photo-electric cells 30 to 33 may either be connected with indicating means operating whenever light beam 25 impinges on one of them or these cells may be used for influencing adjusting means in the way shown in the drawing. These adjusting means consist of several, e. g. four, pressing levers 35 turnably secured by brackets 36 to the rotating support 21 and preferably rotating with the same and lens 20 supported by this support. These pressing levers are operated by a series of electro-magnetic devices 37, each of which is influenced in well-known way by one of the photo-electric cells 30 to 33. The detailed construction of such electro-magnetic devices is so well-known to everybody skilled in this art that they need not be described in detail and that it suffices to state that each of these devices should operate, i. e. turn, one of the levers 35 in direction of arrow 38, thereby moving the center 27 of lens 20 toward the axis of rotation 23 of support 21, whenever light beam 25 impinges on the corresponding photo-electric cell.

My new lens centering device operates as follows: lens 20 is placed on support 21 without being correctly adjusted; means not shown in the drawing, e. g. a vacuum creating device, are provided for holding the lens slidably but not removably in contact with the hollow support 21. Then rotation of support 21 is started. The light beam 25 emitted by light source 24 will pass through lens 20 and be deflected from its predetermined path 25 by this lens as the same is not in correct adjusted position. This deflected light beam will rotate together with lens 20 and support 21 and thus move along a conical surface impinging upon one or the other of the photo-electric cells 30 to 33. Whenever the light beam impinges on one of these cells, the corresponding adjusting lever 35 is put into operation by the electro-magnetic means 37 and presses the lens in direction of arrow 38, forcing it slowly into correct adjusted position with its center in the axis of rotation of support 21. When the lens has been forced into correct adjusted position, the direction of light beam 25, particularly the direction of its central ray, will coincide with the direction of the axis of rotation 23, and none of the photo-electric cells 30 to 33 will be hit by this light beam.

It should be noted that it is possible to arrange on support 34 an additional photo-electric cell 39 in the axis of rotation 23 of support 21 so that light beam 25 impinges on this cell when the lens is in correctly centered position. This cell 39 might be connected with an indicating device 40 in such a manner that this device indicates whenever light beam 25 impinges on cell 39, i. e. whenever lens 20 is in correctly adjusted and centered position on the rotating support 21.

While in the embodiment shown in Figure 4 the light source 24 is arranged within the hollow rotating support 21, it might also be arranged outside this support above lens 20, as for instance shown in Figure 1. In the modification shown in this figure, the light source 24 is arranged above lens 20 in the axis of rotation 23 of support 21 and a reflecting mirror 41 is arranged within the hollow support 21 normal to the direction of its axis of rotation 23. It is evident that, when the lens is in correctly adjusted position, the light beam 25 is reflected by mirror 41 in direction of the axis of rotation 23 but is deflected from this direction by lens 20 if this lens is incorrectly centered. The reflected light beam, if deflected in such a way, will impinge upon one of cells 30 to 33 arranged around light source 24, i. e. around the axis of rotation 23 at different distances from the same.

A further modification of the device shown in Figure 1 is shown in Figure 5 where an additional mirror 42 is arranged in the path of the light beam, thereby enabling arrangement of cells 30 to 33 and light source 24 in practically any desired position, e. g. on a vertical support 43 instead of the horizontal support 34 shown in Figures 1 and 4.

While in all embodiments described above the hollow support 21 rotates about a vertical axis of rotation, Figure 6 shows a modification with a horizontally arranged support 44 rotating about a horizontal axis 45. As all other details of this modification correspond to those of the devices described above, no further detailed explanation of this modification is necessary.

The device shown in Figure 7 is a further modification of my new device, namely one which is adapted for centering a concave lens 46. In this case, a compensating, relatively strong convex negative lens 47 is placed between mirror 41 and the concave lens 46 to be centered. After this step, the centering is carried out in the way described above in detail. It should be noted that I might use a curved mirror instead of the combination of lens 46 and the plane mirror 41; by choosing the curvature of this mirror correctly, the same effect can be obtained by the same as by lens 46 and plane mirror 41 combined.

None of the above described embodiments and modifications of my device, however, are adapted for centering an entirely or substantially symmetrical lens as such a lens has the characteristic feature that a light beam passing through its central portion is not deflected, whatever may be the position of the lens. Therefore, in order to enable centering of such a lens, I propose to arrange the light source 48 outside of the axis of rotation 23 of support 21 and to arrange an additional diaphragm 49 between the symmetrical lens 50 to be centered and mirror 41 arranged within support 21. This diaphragm 49, as shown in Figure 9, is provided with two openings 51 and 52 through which the light beam 53 passes and is reflected as shown in Figure 8. It is evident that by this construction substantial deflections of the light beam can be attained and thus the lens centered as described above in connection with other embodiments of my present invention.

In Figures 10 and 11, various adjusting means are shown which might be advantageously used in combination with my new centering devices. The adjusting brush-like lever 54 shown in Figure 10 presses against the surface of the lens while the two levers 55 shown in Figure 11 are acting against the edge of the lens to be centered.

In Figure 12, I have shown an embodiment of my invention which might be advantageously used if there is no possibility to arrange the photo-electric cells 30 to 33 in the focal plane of lens 20. In this case, I propose to provide in front of light source 24 a diaphragm 56 with a small hole 57 in front of the light source. The light beam 58 will then pass through lens 20 and reach all cells simultaneously. In order to create a difference in the intensity of light reaching the various photo-electric cells if the lens is incorrectly centered, I propose to arrange in the focal plane of lens 20 an opaque screen 59 in the way shown in the drawing. During rotation of support 21 the light beam 58 will oscillate if lens 20 is not in correctly centered position. During such an oscillation, part of the light will reach the opaque screen 59 creating thereby a difference in the intensity of light reaching cells 30 and 31. This difference in light intensity can then be used for automatically adjusting the position of the lens in the way described above.

It will be understood that each of the elements described above, or two or more together, may also find a useful application in other types of optical apparatus differing from the types described above.

While I have illustrated and described the invention as embodied in lens centering devices, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. Device for adjusting the lateral position of a lens on a support in relation to the same comprising a support supporting said lens in horizontal position in such a manner as to enable passage of a light beam through said lens and to enable sliding of said lens on said support in lateral horizontal direction, a light source for projecting a light beam through said lens while it is supported by said support freely slidably in lateral horizontal direction, said light beam passing through said lens and then moving along a predetermined path when said lens is lying on said support in adjusted correct horizontal position and being deflected by said lens from said predetermined path when said lens is lying on said support in unadjusted incorrect non-horizontal position, a series of light-sensitive photo-electric means arranged around said predetermined path of the light beam having passed through said lens at different distances from said path so that said light beam is impinging on one of said light-sensitive photo-electric means when said lens is lying on said support in unadjusted incorrect non-horizontal position and thereby the light beam passing through it is deflected from said predetermined path, and a series of adjusting means each being influenced by said light-sensitive photo-electric means in such a manner as to move said lens laterally toward said adjusted correct position of said lens on said support when said light beam is deflected from said predetermined path and is impinging on said light-sensitive photo-electric means.

2. Device for centering a lens on a rotating support in alignment with the axis of rotation of said support comprising a rotating support supporting said lens at its edge portion slidably in lateral direction, a light source for projecting a light beam through said lens while it is supported by said support and rotating with the same, said light beam passing through said lens and then moving along a predetermined path when the center of said lens is lying in the axis of rotation of said support and being deflected from said predetermined path when said center is outside of said axis of rotation, light-sensitive photo-electric means arranged near said predetermined path of the light beam in such a manner that said light beam is impinging on said light-sensitive photo-electric means when the center of said lens is in lateral direction outside said axis of rotation of the support on which said lens is lying and the light beam passing through said lens is thereby deflected from said predetermined path, and adjusting means influenced by said light-sensitive photo-electric means in such a manner as to slide said lens on said rotatable support laterally with its center toward the axis of rotation of said support when said light beam is deflected from said predetermined path and is impinging on said light-sensitive photo-electric means.

3. Device for centering a lens on a rotating support in alignment with the axis of rotation of said support comprising a rotating support supporting said lens at its edge portion slidably in lateral direction, a light source for projecting a light beam through said lens while it is supported by said support and rotating with the same, said light beam passing through said lens and then moving along a predetermined path when the center of said lens is lying in the axis of rotation of said support and being deflected from said predetermined path when said center is outside of said axis of rotation, a series of light-sensitive photo-electric means arranged around said predetermined path of the light beam having passed through said lens at different distances from said path so that said light beam is impinging on one of said light-sensitive photo-electric means when the center of said lens is in lateral direction outside said axis of rotation of the support on which said lens is lying and the light beam passing through said lens is thereby deflected from said predetermined path, and a series of adjusting means arranged on different sides of said lens around the same, each of said adjusting means being influenced by said light-sensitive photo-electric means in such a manner as to slide said lens on said rotating support laterally with its center toward the axis of rotation of said support when said light beam is deflected from said predetermined path and is impinging on said light-sensitive photo-electric means.

4. Device for centering a lens on a rotating support in alignment with the axis of rotation of said support, comprising a hollow substantially cylindrical support supporting said lens, means rotating said support about its axis of rotation, a light source arranged in the axis of rotation of said support for projecting a light beam through said lens while it is supported by said support and rotating with the same, the central ray of said light beam passing through said lens undeflected and moving along the axis of rotation of said support when the center of said lens is lying in the axis of rotation of said support and being deflected from said axis of rotation when said center is in lateral direction outside said axis of rotation, light-sensitive photo-electric means arranged near said axis of rotation in such a manner that said light beam is impinging on said light-sensitive photo-electric means when said lens is lying on said rotating support in uncentered incorrect position and the central ray of said light beam passing through said lens is thereby deflected from said axis of rotation, and adjusting means influenced by said light-sensitive photo-electric means in such a manner as to move said lens in lateral direction with its center toward said axis of rotation of said support when the central ray of said light beam passing through said lens is deflected from said axis of rotation and the light beam thus impinges on said light sensitive photo-electric means.

5. In a device for centering a lens on a rotating support in alignment with the axis of rotation of said support, in combination a hollow support supporting said lens, means rotating said support about its axis of rotation, a light source arranged on one side of said lens in the axis of rotation of said support for projecting a light beam through said lens while it is supported by said support and rotating with the same, a mirror arranged on the opposite side of said lens normal to the axis of rotation of said support crossing said axis and reflecting the light beam after the same has passed through said lens back through said same lens, the central ray of said light beam passing through said lens undeflected and moving along the axis of rotation of said support when the center of said lens is lying in the axis of rotation of said support and being deflected from said axis of rotation when said center is in lateral direction outside of said axis of rotation, and light-sensitive photo-electric means arranged near said axis of rotation in such a manner that said reflected light beam is impinging on said light-sensitive photo-electric means when said lens is lying on said rotating support in uncentered laterally incorrect position and the central ray of said reflected light beam passing through said lens is thereby deflected from said axis of rotation.

6. Device for centering a lens on a rotating support in alignment with the axis of rotation of said support, comprising a hollow support supporting said lens, means rotating said support about its axis of rotation, a light source arranged above said lens outside of said support in the axis of rotation of said support for projecting a light beam through said lens while it is supported by said support and rotating with the same, a mirror arranged within said hollow support normal to the axis of rotation of said support crossing said axis and reflecting the light beam after the same has passed through said lens back through said same lens, the central ray of said light beam passing through said lens undeflected and moving along the axis of rotation of said support when the center of said lens is lying in the axis of rotation of said support and being deflected from said axis of rotation when said center is in lateral direction outside of said axis of rotation, light-sensitive photo-electric means arranged near said axis of rotation in such a manner that said reflected light beam is impinging on said light sensitive photo-electric means when said lens is lying on said rotating support in uncentered laterally incorrect position and the central ray of said reflected light beam passing through said lens is thereby deflected from said axis of rotation, and adjusting means influenced by said light-sensitive photo-electric means in such a manner as to move said lens with its center in lateral direction toward said axis of rotation of said support when the central ray of said reflected light beam passing through said lens is deflected from said axis of rotation and the light beam thus impinges on said light sensitive photo-electric means.

7. In a device for centering a lens on a rotating support in alignment with the axis of rotation of said support, in combination a hollow support supporting said lens, means rotating said support about its axis of rotation, a light source arranged on one side of said lens in the axis of rotation of said support for projecting a light beam through said lens while it is supported by said support and rotating with the same, a mirror arranged on the opposite side of said lens normal to the axis of rotation of said support crossing said axis and reflecting the light beam after the same has passed through said lens back through said same lens, the central ray of said light beam passing through said lens undeflected and moving along the axis of rotation of said support when the center of said lens is lying in the axis of rotation of said support and being deflected from said axis of rotation when said center is in lateral direction outside of said axis of rotation, and a series of light-sensitive photo-electric means arranged around said axis of rotation at different distances therefrom in such a manner that said reflected light beam is impinging on one of said light-sensitive photo-electric means when said center of said lens is in lateral direction outside of said axis of rotation and the central ray of said reflected light beam passing through said lens is thereby deflected from said axis of rotation.

8. Device for centering a lens on a rotating support in alignment with the axis of rotation of said support, comprising a hollow support supporting said lens, means rotating said support about its axis of rotation, a light source arranged on one side of said lens in the axis of rotation of said support for projecting a light beam through said lens while it is supported by said support and rotating with the same, a mirror arranged on the opposite side of said lens normal to the axis of rotation of said support crossing said axis and reflecting the light beam after the same has passed through said lens back through said same lens, the central ray of said light beam passing through said lens undeflected and moving along the axis of rotation of said support when the center of said lens is lying in the axis of rotation of said support and being deflected from said axis of rotation when said center is in lateral direction outside of said axis of rotation, a series of light-sensitive photo-electric means arranged around said axis of rotation at different distances therefrom in such a manner that said reflected light beam is impinging on one of said light-sensitive photo-electric means when said center of said lens is in lateral direction outside of said axis of rotation and the central ray of said reflected light beam passing through said lens is thereby deflected from said axis of rotation, and a series of adjusting means, each of said adjusting means being influenced by said light-sensitive photo-electric means in such a manner as to move said lens with its center in lateral direction toward said axis of rotation of said support when the central ray of said reflected light beam passing through said lens is deflected from said axis of rotation and the light beam thus impinges on said light sensitive photo-electric means.

9. In combination with a lens centering device of the type claimed in claim 2, a light-sensitive photo-electric cell arranged in said predetermined path of the light beam after the same has passed through said lens, and indicating means operated by said light-sensitive photo-electric cell whenever said light beam impinges on it, thereby indicating that the center of said lens is in the axis of rotation of the support supporting said lens and the lens itself is in laterally correctly centered position.

10. Device for centering a lens on a rotating support in alignment with the axis of rotation of said support, comprising a hollow substantially cylindrical support supporting said lens along its edges, means rotating said support about its axis of rotation, a light source arranged in the axis of rotation of said support for projecting a light beam through said lens while it is supported by said support and rotating with the same, the central ray of said light beam passing through said lens undeflected and moving along the axis of rotation of said support when the center of said lens is lying in the axis of rotation of said support and being deflected from said axis of rotation when said center is in lateral direction outside of said axis of rotation, light-sensitive photo-electric cells arranged around said axis of rotation in such a manner that said light beam is impinging on one of said cells whenever the center of said lens is lying in lateral direction outside of the axis of rotation of said support and the central ray of said light beam passing through said lens is thereby deflected from said axis of rotation, an electric circuit including said photo-electric cells, a source of current and a series of electro-magnetic operating means, and a series of adjusting means each operated by said electro-magnetic means in such a manner as to move said lens with its center in lateral direction toward the axis of rotation of said support when the central ray of the light beam passing through said lens is deflected from said axis of rotation and the light beam thus impinges on one of said light-sensitive photo-electric cells.

11. In a device for centering a symmetrical lens on a rotating support in alignment with the axis of rotation of said support in combination a light source arranged on one side of said lens for projecting a light beam through said lens while it is supported by said support and rotating with the same, a mirror arranged on the opposite side of said lens reflecting the light beam after the same has passed through said lens, a diaphragm provided with two openings, said diaphragm being arranged in the path of said light beam between said lens and said mirror in such a manner that said light beam is passing through one opening of said diaphragm before it impinges upon said mirror and is reflected by said mirror through the other of said openings, said reflected light beam then passing again through said same lens and moving along a predetermined path when the center of said lens is lying in the axis of rotation of said support and being deflected from said predetermined path when said center is in lateral direction outside of said axis of rotation, and light-sensitive photo-electric means arranged near said predetermined path of said reflected light beam in such a manner that said light beam is impinging on said light-sensitive photo-electric means when the center of said lens is in lateral direction outside of said axis of rotation of the support on which said lens is lying and the reflected light beam passing through said lens is thereby deflected from said predetermined path.

12. In a centering device of the type claimed in claim 3, each of said adjusting means being constructed so as to press against a certain edge portion of the lens to be centered in direction of the axis of rotation of said support whenever the light beam passing through said lens impinges on the corresponding photo-electric means.

13. Device for adjusting the lateral position of a lens on a support in relation to the same comprising a support supporting said lens at least along its edge portion slidably in lateral direction, a light source for projecting a light beam on said lens while it is supported by said support, said light beam moving along a predetermined path when said lens is lying on said support in adjusted correct position and being deflected by said lens from said predetermined path when said lens is lying on said support in unadjusted incorrect position, light-sensitive photo-electric means arranged near said predetermined path of the light beam in such a manner that said light beam is impinging on said light-sensitive photo-electric means when said lens is lying on said support in unadjusted incorrect position and thereby the light beam is deflected from said predetermined path, and adjusting means influenced by said light-sensitive photo-electric means in such a manner as to slide said lens on its support laterally toward said adjusted correct position of said lens on said support when said light beam is deflected from said predetermined path and is impinging on said light-sensitive photo-electric means.

14. Device for adjusting the position of a lens on a support comprising a support supporting said lens at least along its edge in horizontal position freely slidably in lateral direction, a light source for projecting a light beam on said lens while it is supported by said support freely slidably in lateral horizontal direction, said light beam moving along a predetermined path when said lens is lying on said support in adjusted correct horizontal position and being deflected by said lens from said predetermined path when said lens is lying on said support in unadjusted incorrect non-horizontal position, a series of light-sensitive photo-electric means arranged around said predetermined path of the light beam at different distances from said path so that said light beam is impinging on one of said light-sensitive photo-electric means when said lens is lying on said support in unadjusted incorrect non-horizontal position and thereby the light beam is deflected from said predetermined path, and adjusting means influenced by said light-sensitive photo-electric means in such a manner as to slide said lens on its support laterally toward said adjusted correct position of said lens on said support when said light beam is deflected from said predetermined path and is impinging on said light-sensitive photo-electric means.

15. Device for centering a lens on a rotating support in alignment with the axis of rotation of said support comprising a rotating support supporting said lens at least along its edge portion slidably in lateral direction, a light source for projecting a light beam on said lens while it is supported by said support and rotating with the same, said light beam moving along a predetermined path when the center of said lens is lying in the axis of rotation of said support and being deflected from said predetermined path when said center is outside of said axis of rotation, light-sensitive photo-electric means arranged near said predetermined path of the light beam in such a manner that said light beam is impinging on said light-sensitive photo-electric means when the center of said lens is in lateral direction outside said axis of rotation of the support on which said lens is lying and the light beam is thereby deflected from said predetermined path, and adjusting means influenced by said light-sensitive photo-electric means in such a manner as to slide said lens on its support laterally with its center toward the axis of rotation of said support when said light beam is deflected from said predetermined path and is impinging on said light-sensitive photo-electric means.

16. Device for centering a lens on a rotating support in alignment with the axis of rotation of said support comprising a rotating support supporting said lens at least along its edge portion slidably in lateral direction, a light source for projecting a light beam on said lens while it is supported by said support and rotating with the same, said light beam moving along a predetermined path when the center of said lens is lying in the axis of rotation of said support and being deflected from said predetermined path when said center is outside of said axis of rotation, a series of light-sensitive photo-electric means arranged around said predetermined path of the light beam at different distances from said path so that said light beam is impinging on one of said light-sensitive photo-electric means when the center of said lens is in lateral direction outside said axis of rotation of the support on which said lens is lying and the light beam is thereby deflected from said predetermined path, and adjusting means influenced by said light-sensitive photo-electric means in such a manner as to slide said lens on its support laterally with its center toward the axis of rotation of said support when said light beam is deflected from said predetermined path and is impinging on said light-sensitive photo-electric means.

JACQUES BOLSEY.